United States Patent

Swift et al.

[11] 3,903,644
[45] Sept. 9, 1975

[54] SELF-WATERING PLANTER AND METHOD OF MAKING SAME

[76] Inventors: June H. Swift, P.O. Box 28012; John A. Swift, 2740 Mayhew St., both of Dallas, Tex. 75228

[22] Filed: May 21, 1973

[21] Appl. No.: 362,535

[52] U.S. Cl. .......... 47/38; 47/58; 156/64; 156/253; 156/295; 264/154; 264/DIG. 76
[51] Int. Cl.² .......... A01G 27/00; B29C 17/08; G01D 21/00
[58] Field of Search .......... 47/38, 38.1, 48.5, 41; 220/9 B, 9 C, 13; 264/154, DIG. 76; 156/253, 295, 303.1, 64

[56] References Cited
UNITED STATES PATENTS

| | | | |
|---|---|---|---|
| 608,664 | 8/1898 | Free | 47/38 |
| 1,815,195 | 7/1931 | Fauata, Jr. | 47/38 |
| 1,815,676 | 7/1931 | Meduczky | 47/38 |
| 2,115,122 | 4/1938 | Prudden | 264/154 |
| 2,288,678 | 7/1942 | Blumentritt | 47/38 |
| 2,622,415 | 12/1952 | Landers et al. | 220/13 |
| 2,713,752 | 7/1955 | Sobol | 47/38.1 |
| 2,865,137 | 12/1958 | Longacre | 47/38.1 |
| 2,885,825 | 5/1959 | Longacre | 47/38 |
| 3,192,665 | 7/1965 | Cloud | 47/38.1 |
| 3,302,324 | 2/1967 | MacDonald et al. | 47/38 X |
| 3,753,315 | 8/1973 | Adam | 47/38 |
| 3,775,904 | 12/1973 | Peters | 47/38.1 |
| 3,783,555 | 1/1974 | Peters | 47/38 |

FOREIGN PATENTS OR APPLICATIONS 496,138  10/1950  Belgium .......... 47/38.1

*Primary Examiner*—Edgar S. Burr
*Assistant Examiner*—Steven A. Bratlie

[57] ABSTRACT

An automatic self-regulating water control arrangement in a unique structural planter configuration that is suited to an economical and yet foolproof method of manufacturing. A vacuum control is necessary to properly dispense the moisture required, and the final sealing of the water reservoir provides the secure vacuum means needed and permits conclusive testing before putting into use.

3 Claims, 11 Drawing Figures

PATENTED SEP 9 1975    3,903,644
SHEET 1 OF 2
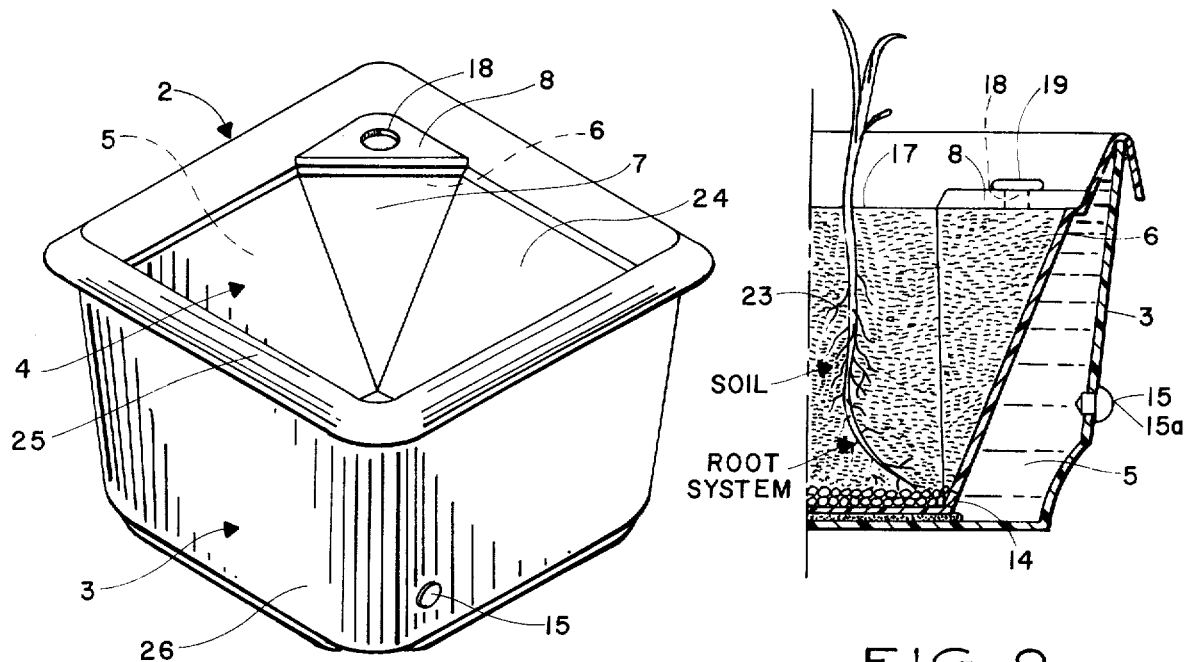
FIG. 1
FIG. 9
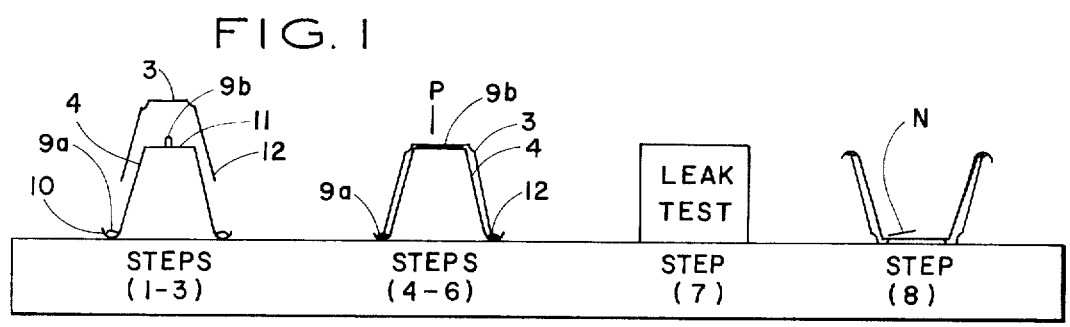
FIG. 11
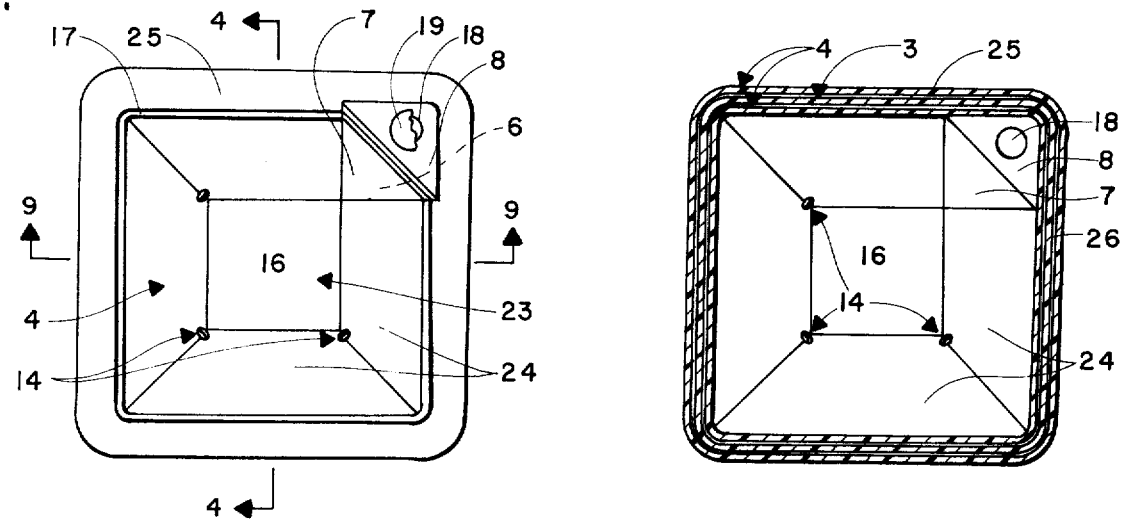
FIG. 2    FIG. 3

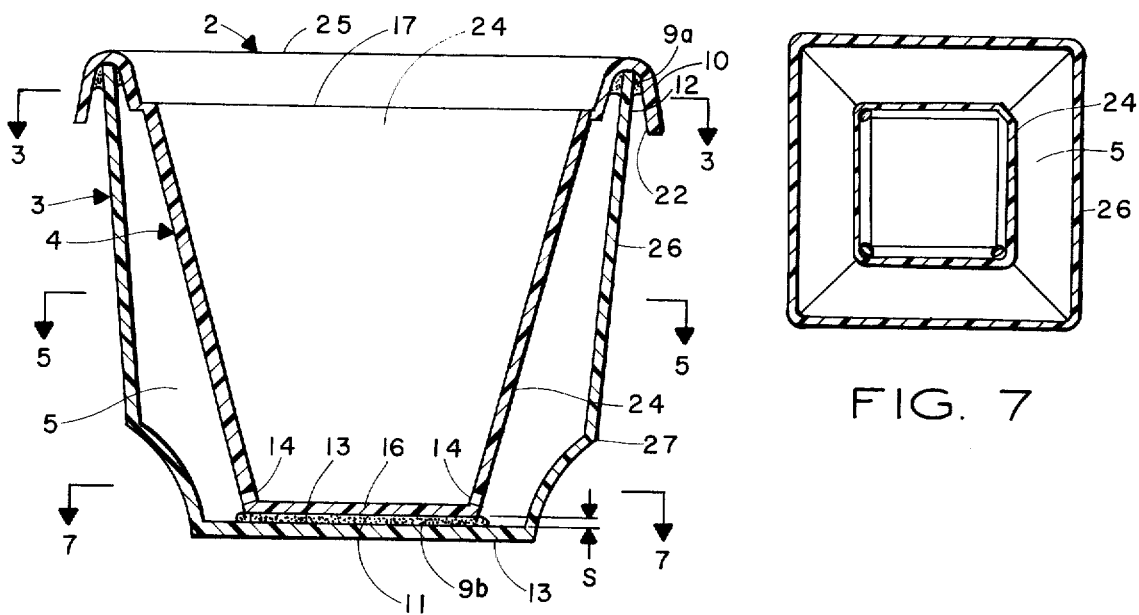
FIG. 4
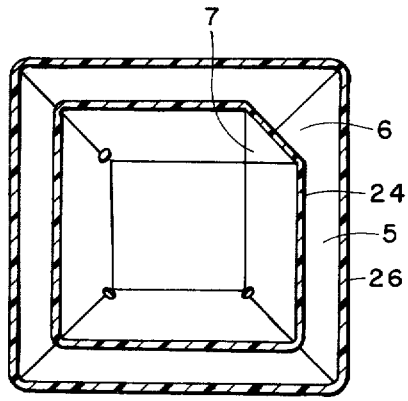
FIG. 7
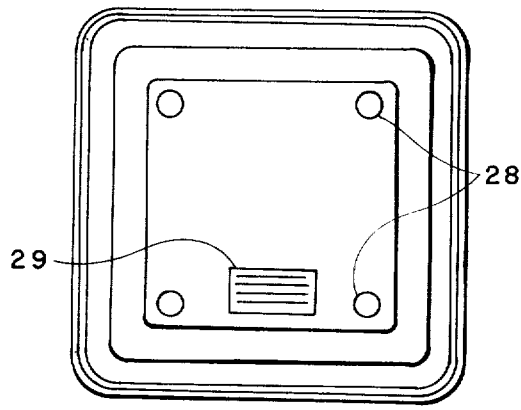
FIG. 6
FIG. 5
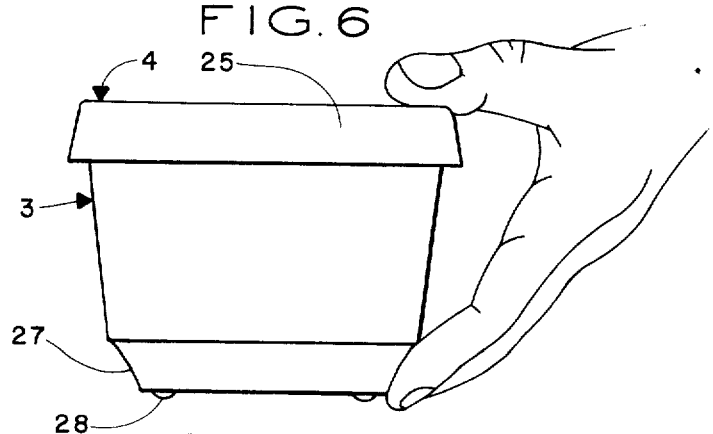
FIG. 10
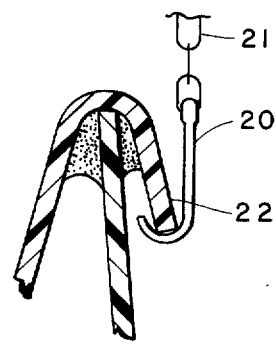
FIG. 8

SELF-WATERING PLANTER AND METHOD OF MAKING SAME

BACKGROUND OF THE INVENTION

1. Field of the Invention

This invention relates generally to flower and plant containing pots and planters and more particularly to that class of such containers that are self-watering.

2. Statement of the Prior Art

The prior art discloses self-watering planters in which the water level is controlled through the use of a vacuum, but for the most part, these planters are difficult to construct and subject to certain deficiencies in operation.

Examples of such prior art devices may be seen in the following patents:

U.S. Pat. No. 3,043,053 to Peters disclosed a plastic molded self-watering flower pot that had an upper section defining a peripherial water chamber and a relatively large central opening in its bottom wall and wherein a water regulating plastic pad surrounded the opening. A bottom plate having a passage from the opening to the water chamber was then bonded to the lower inside periphery of the outer side walls.

U.S. Pat. No. 3,192,665 to Cloud disclosed a two piece self-regulatory flower pot in which a soil receptacle is suspended in a transparent outer shell forming a water chamber therebetween. The soil receptacle is made of porous material so that water from the chamber may pass through the porous material into the soil in response to moisture tension.

U.S. Pat. No. 1,214,356 to Natvig disclosed a receptacle having inner and outer walls spaced apart with webs and defining a water space therebetween and having feed apertures in the inner bottom wall to permit moisture passage into the soil area.

U.S. Pat. No. 2,084,005 to Richards disclosed an auto irrigation system having vertical outer walls and inclined inner walls defining a water chamber to permit water passage through the porous ceramic inner wall under pressure.

U.S. Pat. No. 2,344,794 to Vallinos was for a combined flowerpot and jardinierre in which the outer walls are glazed to prevent moisture escape. The flowerpot was spaced from the bottom of the jardinierre and permitted water passage therebetween. The flowerpot nested into the jardinierre and their outer walls engaged in a flush manner and sealed off the water area. This combination did not however rely on a vacuum feed technique for its operation.

While other patents have also been granted in the art of self-watering planters, and while they, like the above cited disclosures, serve useful functions in this crowded art, none of them accomplish the applicant's purpose in the manner or with the structure of the applicant's invention.

SUMMARY OF THE INVENTION

A principal object of this invention is to provide a simple, easy to assemble self-watering planter and a fool-proof economical method of manufacturing same, to that once assembled and tested, the user may be assured of years of productive usage.

Another object is to provide a method of manufacturing a two-piece plastic planter assembly wherein a soil receptacle is surrounded by a water container and the two pieces are assembled after molding into a water and air tight structure that is fully tested for leakage before completion, to insure that proper operation will occur when filled with soil and water.

A still further object is to provide a light-weight self-watering planter that contains a non-destructible soil indicating line and a water inlet opening that will always be above the soil line so that soil will not slip through the water fill opening and clog the lower water capillary openings.

And yet another object of this invention is to provide a structurally secure yet extremely thin wall planter assembly that is of a convenient size for lifting with one hand in structurally reinforced areas. This same structural configuration also permits the entire assembly to be suspended by spaced apart hooks at the top rim of the planter requiring no bottom support other than that built integrally into the outer and inner shells at their reinforced bottom contact.

BRIEF DESCRIPTION OF THE DRAWINGS

FIG. 1 is a perspective view of the self-watering planter of this invention in an unfilled condition.

FIG. 2 is a top plan view of the device shown in FIG. 1 with its filler plug shown in fragmentary view.

FIG. 3 is a plan cross-sectional view taken along the lines 3—3 of FIG. 4.

FIG. 4 is an elevational view in cross-section taken along the lines 4—4 of FIG. 2.

FIG. 5 is a plan cross-sectional view taken along the lines 5—5 of FIG. 4.

FIG. 6 is a bottom plan view of the device of FIG. 1.

FIG. 7 is a plan cross-sectional view taken along the lines 7—7 of FIG. 4.

FIG. 8 is an enlarged detailed fragmentary elevational view in cross-section of the upper right corner of FIG. 4 showing a means for suspending the planter from a ceiling or the like.

FIG. 9 is an enlarged cross-sectional fragmentary elevational view taken along the lines 9—9 of FIG. 2 and showing the planter in its functional use.

FIG. 10 is an outline view of the complete planter being manually transported by means of its unique structural configuration.

FIG. 11 is a diagrammatic outline view showing certain method steps employed in this invention.

DESCRIPTION OF ILLUSTRATED EMBODIMENT

This invention is particularly adapted to be constructed of a plastic material that may be injection molded into very thin semi-rigid wall members. Specific examples, by way of illustration but not of limitation, of the type of plastics that may be used are as follows:

A B S
DELDRIN
NYLON
POLYSTYRENE (hi impact)
PVC
POLYPROPOLENE

Other requirements of the material selected for use in this invention are that it be light in weight, non-porous, easily and securely bonded to itself, and easily pierced. The wall thickness of the material in the finished product is an important factor in the strength and cost and should desirably be held within the range of 0.050 – 0.150 inch, and the preferably size being 0.0625 inch.

FIG. 1 shows the self-watering planter of this invention in a pictorial view before it has been filled with earth or water. Its construction may be best explained by simultaneous reference to both FIGS. 1 and 4. The planter, identified generally at 2, is comprised of an outer shell 3 which functions as a support for the inner shell 4 and as a water reservoir 5 when the two shells are joined. The inner shell 4 is offset at one corner to form an enlarged water cavity 6 having a corner plate 7 and enclosed by a triangular top plate 8.

The two shells 3 and 4 are injection molded in separate operations and after water level hole 15a is drilled and water level indicating plug 15 glued in place, are then assembled in the manner shown in FIGS. 4 and 11 through the following steps to form a planter structure, using a suitable bonding or glue such as lacquer thinner, polystyrene adhesive or preferably a special mixture of the material of the planter dissolved in lacquer thinner to a fluid paste consistency (i.e. polystyrene chunks dissolved in clear lacquer thinner — Cook's No. 89):

1. Invert inner shell 4 on table or workbench.
2. Deposit layer or a ribbon of glue 9a, in channel 10 formed in lip when shell 4 is inverted.
3. Deposit layer or a blob of glue 9b on outer bottom surface 11 of inner shell 4.
4. Superimpose outer shell 3 over inner shell 4 while the latter is still inverted and apply manual pressure (P) to force outer shell edge 12 in direct contact with inner cavity of channel 10 of inner shell 4 and allow parts to securely bond together. In this step, the open upper edge 12 of shell 3 "bottoms out" in the channel 10, but the dimensions of the parts are such that a space (S) remains and is filled with glue 9b.
5. While edge 12 and the cavity of channel 10 are being bonded, the sea of glue 9a maintains a uniform height completely around the periphery of channel 10 due to the uniform pull of gravity on the compliant medium that glue is until it hardens.
6. Simultaneously, with the bonding of edge 12 and channel 10, the outer bottom surface 11 of inner shell 4, which is slightly spaced from the corresponding surface of inner bottom 13 of outer shell 3, is being bonded to surface 13 through the layer of glue 9b that was previously deposited thereon.
7. When the glue has sufficiently hardened (approximately 24 hours) the now assembled planter unit is completely submerged in water to test all joints and the material itself for air leaks using an air pump having a pressure nozzle that will form an air-tight fit with water fill opening 18.
8. If no leaks are present, the air pump connection is removed and the planter 2 is returned to the bench in an upright position and three holes 14 are selectively pierced through the thin plastic walls using a hot No. 9 needle (N). The three holes 14 (approximately 0.010 – 0.020 inch diameter) are located, one at each corner, except the corner containing water cavity 6, and will function as air/water inlets when the planter 2 is in use.

The planter 2 is now ready for use in its intended function which may be best accomplished by the following steps (See FIG. 9):

1. Deposit a layer of bird-gravel size or smaller rock or gravel in the bottom of inner shell 4 to a height above the openings 14 which were formed just above the inner bottom 16 of inner shell 4.
2. Fill the balance of the space in shell 4 with loose soil up to soil line 17 but not above, and pack while filling to moderate density.
3. Insert plants before, during or after the filling operation (2) as is most convenient in view of the initial size of the plant.
4. Fill the water reservoir 5 and enlarged cavity 6 with clean water and diluted plant food (one-eighth of a teaspoon of plant food powder per gallon of water, or greater depending on plant food strength) until the liquid mixture (referred to as "water" for convenience) is visible at the water fill opening 18 on triangular cover plate 8 of inner shell 4.
5. Insert water fill plug 19 and place planter on level surface, preferably under a fluorescent lamp; or in a naturally lighted or darkened area as desired, or
6. Attach hooks 20 of a suspended chain 21 at appropriate locations (3 or 4) around the free lip 22 surrounding channel 10.

When the planter is in use the root system indicated in FIG. 9 with most plants will not extend far enough down to reach the floor 16, although some roots may travel down to and possibly engage floor 16. Continued growth would then cause the roots to travel laterally along floor 16 and possibly enter one of the air/water inlet holes 14. Such an entrance may block the opening and prevent passage of either air or water therethru. In planters containing only two openings, this blocking of one hole would render the planter inoperative, whereas with three holes the operation cycle will continue, since one hole can admit air into the reservoir and the second hole can release water through capillary action of the adjacent rocks or soil. The chances of two holes being clogged by roots are very remote.

Two holes 14 of the size indicated (0.020 inch approximate maximum diameter) are sufficient and three holes are satisfactory to meter the water into the gravel and/or soil area when filling reservoir 5. More than three holes, or holes of a larger size would permit the water in the reservoir to flow in too fast when filling and thus saturate too much of the soil which would damage the plant. If two holes do become clogged (which is remote) the owner can simply remove the soil and punch out the hole with a needle. Whereas in planters that utilize sponge inserts or porous materials, it has been found that plant roots destroy these elements and they are not readily replaceable, or the condition correctable, by the owner.

FIG. 2 shows a top plan view of the planter 2 from a position of looking into the soil cavity, identified generally at 23. It will be observed that all of the inner walls 24 taper inwardly toward bottom plate 16, and that at the intersection of two of the walls 24 there is inserted a triangular corner plate 7 which, together with top plate 8, cover the enlarged corner water cavity 6. The three air/water inlet holes 14 just above bottom plate 16 are also visible in this drawing figure. Just inside the periphery of ridge 25 of the planter 2 is located an indentation or offset 17 in the tapered inner walls 24 so that the user may properly locate the level to which the soil may come for optimum operation. This soil line marker is permanent and cannot be erased with time. If soil were packed in the planter above this line it could find its way into and through opening 18 and thus provide a danger of clogging the openings 14 from inside the reservoir 5. Water fill opening 18 is sealed by plug 19 in both a water-tight and air-tight relationship, since the self-watering feature of this planter operates on a vacuum principle. It will be noted that triangular cover plate 8 engages the inner shell 4 just above the soil line offset 17, so that the water fill opening 18 is higher than the soil line 17 by the thickness of plate 8. This construction feature insures that loose soil will not seep into the reservoir water cavity 6 by way of hole 18.

FIG. 3 is a cut-away view of the planter particularly as shown in FIGS. 2 and 4. This figure shows the intimate relationship between the structural parts of the outer and inner shells 3 and 4 that cooperate and reenforce each other to provide a structurally stable planter even though all of the parts are thinner than would be feasible for use as the inner receptacle or the outer container if the parts were used separately. However, by making the outer container shell 3 slightly thicker it may be used as a stand-alone container that is suitable for nesting while shipping or storing. As a practical matter, it may be desirable to make a stand-alone thickness container in the first instance, so that only one mold is necessary. Production runs could then be made of say 1000 inner shells 4 and 1500 outer shells 3, so that 500 outer shells would be available for separate usage. Similarly the walls of the inner shell may be made thicker than the walls of the outer shell if desirable.

FIG. 4 shows in detail how shells 3 and 4 combine to provide the strength and stability described above. The outer shell 3 surrounds the inner shell 4 and is firmly bonded thereto at only two locations: free end 12 of outer shell side walls 26 is firmly attached to the inner shell 4 in the cavity of channel 10; and the inner bottom surface 13 of outer shell 3 is firmly attached to the outer bottom surface 11 of inner shell 4. If the space "S" is the same thickness as the wall of the outer shell 4, and the wall of the inner shell is twice the thickness of the outer shell wall, then the overall height of the shells 3 and 4 will be identical within the manufacturing tolerances. The soil level line offset 17 also lends strength to the thin inner shell sidewalls 24, as does the concave ridge 27 that connects outer shell sidewalls 26 with outer shell bottom 13. The configuration of both the outer shell 4 and inner shell 3 are such that these parts are easily molded in a high pressure plastic injection mold, which will simultaneously form the four feet 28 and install nameplate 29 as shown in FIG. 6. Optionally, the information on the nameplate may be included in the mold, so that no separate piece is required. Also optionally, the water fill plug 19 may be made of the same plastic as the planter body and if tapered slightly inwardly toward the bottom, will effectively seal the opening 18.

FIGS. 5 and 7 are plan cross-sections of FIG. 4 taken near the midpoint and bottom respectively to show the vast amount of reservoir that is provided in this planter relative to its total dimensions. The main reservoir 5 occupies the space between outer side walls 26 and the inner side walls 24, but as a practical matter, reservoir 5 overlaps and hence includes the water cavity 6 which is obtained by the inclusion of corner plate 7 in lieu of a straight line corner. This added water capacity of cavity 6 adds approximately 20% to the reservoir capacity and hence extends the time between water filling by that amount.

A feature of this invention that adds to its merit is the economy and high productivity that is gained by the combination of its structure and the method employed to assemble the structural parts. For example, it is well known in product manufacture that the greater the precision required, the higher the cost. But by using the method of making this planter 2 as shown in FIG. 11, it will be seen that the labor required is minimal and that no great precision is required. This latter is true because glue which is pliable until hardened is used in both instances where parts are joined. The glue can of course expand or contract to fill the void and thereby provide water and air-tight seals while providing the structural strength needed. The only dimensional requirement is that the free end 12 of the outer shell 3 seat in channel 10 before the bottom plates 16 and 13 of inner shell 4 and outer shell 3 engage, and the space S shown in FIG. 4 may vary within reasonable and low precision limits and the glue 9b will still fill the space and provide an effective and rigid article.

After the planter has been completed by the steps described above relative to FIGS. 4 and 11, it may be lifted and carried about as shown in FIG. 10, by placing one's fingers in the lower concave ridge 27 and placing the thumb over the top ridge 25. And, after the planter has been filled with soil, plants and water as described with reference to FIG. 9, it may still be transported as shown in FIG. 10. At this point it may also be suspended in mid-air for display purposes by attaching a small hook about the lower end 22 of ridge 25 at three or more spaced points around the periphery of the ridge 25. The projecting lip 22 also provides an easy lifting and transporting means for one hand or two hand manipulation.

The water level indicating plug 15 may be made of the same material as the planter if transparent. Due to the conical shape of the inner end of the plug, the reflection of light to the outside will be different when the water level is above the plug than when it is below the plug. This will provide a visual indication to an observer when the water (and plant food) in the reservoir needs replenishing. This plug 15 may also be of translucent plastic and may be installed in planters made in a variety of materials.

As simple as the construction of this planter would appear to the lay observer, and as loose as the dimensions have been made in those areas that contribute to economical assembly, there are certain areas of criticality (described above) in this planter and its manufacture, that, because of the demands of the user and the economics of the market place, if not observed and followed, would work to the detriment of the entrapeneur/manufacturer. These areas are the wall thickness dimensions, the air/water inlet hole diameters, the peripherial square dimensions of both shells, for registration purposes, and even the gravel size when filling for use must be controlled (but with less critical limits).

Since the preferred construction here uses injection molded plastic, the outer and inner shells, being made in separate molds, may be made of different colored plastics for appearance sake. And, the outer shell may be made of transparent or translucent plastic so that the water level may be detected without the need of a separate water level indicator plug.

In the planter described herein, the peripherial sealing glue is exposed and accessible for easy repair after test, but it is not visible in ordinary use, and therefore, not unattractive.

From the foregoing description and examples, it will be seen that there has been produced a method and a device which substantially fulfills the objects of this invention as set forth herein. The invention is not limited to what is herein shown and described, but is applicable to that which falls within the scope of the appended claims.

We claim:

1. A plastic, vacuum operated, automatically controlled, self-watering planter structure, comprising:
    a. an inner plastic shell of a particular height having a square bottom and a U-shaped channel and defining a water fill opening,
    b. an outer plastic shell of identical height and having a square bottom larger than the inner shell and a free open end and defining a water level indicator opening,
    c. a ribbon of plastic base glue joining the top of said outer shell to said inner shell in said U-shaped channel,
    d. a layer of plastic base glue joining the outer bottom of said inner shell to the inner bottom of said outer shell,
    e. said inner shell defining openings of approximately 0.010 – 0.020 inch in diameter in at least three corners near said square bottom,
    f. a water fill opening plug in vacuum-tight engagement with said water fill opening, and
    g. a water level indicator plug of translucent material in vacuum-tight engagement with said water level indicator opening.

2. A method of making an all plastic vacuum operated self-watering planter having a water fill opening and water level indicator comprising the steps of:
    a. injection molding an inner plastic shell of a particular height having a square bottom and a U-shaped channel,
    b. injection molding an outer plastic shell of identical height and having a square bottom larger than the inner shell and a free open end,
    c. inverting the inner shell on a neutral surface and depositing a continuous ribbon of plastic base glue in U-shaped channel,
    d. depositing a blob of plastic base glue on the exposed bottom plate of the inverted inner shell,
    e. superimposing the inverted outer shell over the inverted inner shell and applying manual pressure until the open end of the outer shell bottoms in the U-shaped channel while being surrounded by the glue therein,
    f. simultaneously applying manual pressure to the topmost surface of the bottom plate of the inverted outer shell to cause an even flow of glue between the adjacent bottom plates,
    g. releasing all manual pressure before the glue firmly sets and allowing the elapse of approximately one hour before further handling of the now assembled planter structure,
    h. reinverting the now assembled planter structure and inserting an air pressure nozzle in said water fill opening,
    i. submerging the planter in clear water and holding submerged while filling with air pressure for period sufficient to observe any air bubbles indicating a leak,
    j. removing said planter from the water, drying and repairing detected leaks with plastic base glue,
    k. heating the tip of a number 9 or smaller needle,
    l. piercing holes of a size of 0.010 – 0.020 inch in diameter in three corners in the inner shell just above the square bottom.

3. A method of making a planter as in claim 2, comprising the steps of creating a water level indicator opening in the outer shell and installing a plastic reflecting type water level indicator therein.

* * * * *